United States Patent Office 3,178,350
Patented Apr. 13, 1965

3,178,350
BIOLOGIC ANTIGENS ADJUVANTED WITH A COLLOIDALLY WATER-SOLUBLE POLYMER OF ACRYLIC ACID CROSSLINKED WITH POLYALLYL SUCROSE OR POLYALLYL PENTAERYTHRITOL
Lloyd J. Lund, Moraga, Calif., assignor to Cutler Laboratories, Inc., a corporation of Delaware
No Drawing. Filed May 15, 1961, Ser. No. 109,870
3 Claims. (Cl. 167—78)

This invention relates to and in general has for its object the provision of an antigen-adjuvant solution, and to a method of preparing such a solution.

ANTIGENS

Antigens are substances which, when injected into a higher organism, cause the formation of antibodies. Examples are: toxoids, ferments or enzymes, allergens, hormones, precipitinogens, glutinogens, opsinogens, lysogens, viral, bacterial, leptospiral and coccidial vaccines.

Antibodies are substances in the body fluids of animals (including humans) which are formed as a result of the exposure of an antigen, and which counteract the effects of the injected antigen.

Many antigens are known to be weak antibody producers in that they fail to produce antibodies rapidly or in sufficient titer to be effective, and it is for this reason that animals as well as humans may contract the same disease repeatedly.

An adjuvant, as herein referred to, is an auxiliary drug or chemical compound which assists or in some way enhances the action of an antigen. The use of various adjuvants to obtain an enhanced antibody response in immunization has been known for some time.

Among the more successful chemicals which have been used for this purpose are alum in connection with diphtheria toxoid, aluminum hydroxide used in connection with various antigens, lanolinlike substances and killed tubercle bacilli used in connection with diphtheria toxoid and bacterial typhosum and more recently hydrated calcium phosphate used in connection with erysipelas and described in the Towey et al. Patent 2,967,802.

The mechanism of the action of adjuvants is not completely understood, although with aluminum hydroxide and similar agents it appears that the antigen is adsorbed on the aluminum hydroxide and that consequently the antigen is slowly but continuously released.

More specifically, the object of this invention is the provision of a mixture of antigen with a small quantity of a colloidally water-soluble polymer of acrylic acid crosslinked with from about 0.75% to 2.00% of a crosslinking agent selected from the class consisting of polyallyl sucrose and polyallyl pentaerythritol.

Another object of this invention is the provision of a mixture of the character above described sufficiently fluid to pass through a hypodermic needle.

Still another object of this invention is the provision of a product of the character above set forth having a substantially neutral pH.

Another object of this invention is the provision of a product of the character above set forth in which the antigen is neutralized in such a way as to form an insoluble salt of a metal chosen from the class consisting of aluminum, calcium and magnesium.

A further object of this invention is the provision of a method for producing the antigen-adjuvant mixture above described.

The acrylic acid polymer above referred to is described in detail in the Warfield et al. Patent 2,909,462 of October 20, 1959. Although this polymer is described by Warfield as being particularly efficacious as a laxative, I have found, as above indicated, that certain forms thereof, when in mixture with an antigen, unexpectedly serve as an adjuvant to enhance the efficacy of the antigen. More specifically, I have found that the colloidally water-soluble polymer of the character defined in claim 1 of the Warfield et al. patent, when brought to a substantially neutral pH and made up into a mixture with an antigen, serves to enhance the efficacy of the antigen in question.

The following mixtures and tests are set forth by way of examples of antigen-adjuvant mixtures made in accordance with my invention, and tests pertaining thereto. Polymers of this character particularly suitable for the purposes of this invention are made by the B. F. Goodrich Chemical Company and designated by the trademarks "Carbopol 934," "Carbopol 940" and "Carbopol 941." As above indicated, these products each consist essentially of a colloidally water-soluble polymer of acrylic acid crosslinked with from 0.75% to 2.00% of a crosslinking agent selected from the class consisting of polyallyl sucrose and polyallyl pentaerythritol.

EXAMPLE NO. 1

*Influenza vaccine*

A. TEST NO. 1

(1) *Preparation of virus.*—Influenza virus, type A, strain PR-8, was harvested from the allantoic cavity of embryonated hen eggs following well established standard procedures. The allantoic fluid was inactivated with formalin. An aliquot of the fluid was lyophilized, the remainder kept in the liquid state. Both liquid and dried virus vaccine were stored at plus 5° C. In addition, the dried material was kept under vacuum.

(2) *Preparation of experimental vaccines.*—Three experimental vaccines were prepared as follows from the dried influenza vaccine, each containing 88.8 mgm. of the dried material.

| Lot No. | Sub-lot | Description |
| --- | --- | --- |
| 111060 LL | A (water control). | 88.8 mgm. dried influenza vaccine was triturated, screened through a 100 mesh sieve, and dissolved in 6 mls. of distilled water. |
| 111060 LL | B (Standard adjuvant). | 88.8 mgm. dried influenza vaccine triturated, screened through a 100 mesh sieve, dissolved in 3 mls. distilled water and then emulsified with 3 mls. of 9 parts Tetradecane to 1 part Arlacel A.[1] |
| 111060 LL | C (test vaccine). | 88.8 mgm. dried influenza vaccine triturated, screened through a 100 mesh sieve, and suspended in 6 mls. of 0.5% "Carbopol 934."[2] |

[1] Atlas Powder Co. brand of Mannide monoleate.
[2] Sufficient distilled water was heated to 60–70° C. The polymer was slowly sifted into the rapidly stirring water. When solution was complete, near maximum gelling was achieved by partially neutralizing the solution to pH 6.5 with Triethanolamine, U.S.P. A variety of both organic and inorganic bases can be used for neutralizing the polymer. Sufficient water was added to bring the gel to final volume when cooled.

(3) *Conduct of experiment.*—24 adult rats were used in the test, divided into three groups of 8 rats each. All of the rats were bled prior to the inoculation with the test vaccines and the sera tested for influenza virus antibodies by the CCA (Chicken Cell Agglutination) standard method. All rats tested negative.

Each group of rats was then inoculated subcutaneously with ½ cc. of one of the three experimental vaccines. The standard HI (Hemaglutination Inhibition) test was run on all three groups after two, four, and six weeks. This test is a measure of antigenic response to influenza vaccine—a formalinized preparation of allantoic fluid of chicken embryos—and is run by combining dilutions of anti-sera with a standard influenza virus preparation, and adding washed, chicken, red corpuscles. Antibody in the serum inhibits virus action, thereby preventing agglutination of the chicken red cells. The highest dilution or titer preventing agglutination is considered the end point of the test and a measure of the effective antibody concentration. The geometric mean for hemaglutination inhibition titers for each group of rats is presented below:

| Lot No. | Sub-lot | 2 weeks | 4 weeks | 6 weeks |
|---|---|---|---|---|
| 111060 LL | A (water control) | 32 | 19.7 | 27.8 |
| 111060 LL | B (std. adjuvant) | 891.3 | 388 | 315.1 |
| 111060 LL | C (test vaccine) | 675.6 | 831.8 | 776 |

These data clearly indicate a high order of adjuvant activity for the polymer.

B. TEST NO. 2

The purpose of presenting the data resulting from this experiment is to show:

That "Carbopol 934," "Carbopol 940" and "Carbopol 941" all show adjuvant activity, and that the choice of base for neutralization of any of these compounds does not alter their adjuvant activity.

(1) *Preparation and titers from experimental vaccines.* —Six experimental vaccines were prepared from dried influenza vaccine (PR-8), each containing 88.8 mgm. of the dried material. The method of preparation follows:

| Lot | Sub-lot | Description | 2-week titers expressed as a geometric mean |
|---|---|---|---|
| 121360 LL | A | 88.8 mgm. of 100 mesh dried influenza vaccine in 6 mls. of 0.5% "Carbopol 934." | 222.8 |
| 121360 LL | B | Same as A only used "Carbopol 940." | 157.6 |
| 121360 LL | C | Same as A only used "Carbopol 941." | 222.8 |
| 121360 LL | D | Same as A only used sodium hydroxide instead of triethanolamine for neutralizing the "Carbopol 934" to pH 6.5. | 137.2 |
| 121360 LL | E | Same as A only used 6 mls. distilled water in place of "Carbopol 934." | 8.0 |
| 121360 LL | F | Same as A only used 6 mls. of standard emulsion adjuvant; 3 mls. of 9 parts tetradecane to 1 part Arlacel A, emulsified with 3 mls. distilled water containing 88.8 mgm. of dried influenza vaccine. | 222.8 |

(2) *Conduct of experiment.*—Same as under Test 1, except that a total of 36 adult rats were used and divided into 6 groups of 6 rats each.

C. TEST NO. 3

(1) *Preparation and titers from experimental vaccines.*

| Lot | Sub-lot | Description | 2-week titers expressed as a geometric mean |
|---|---|---|---|
| 010661 LL | A | 88.8 mgm. dried influenza vaccine in 6 mls. 0.5% "Carbopol 941" neutralized to pH 6.5 with sodium hydroxide. | 362 |
| 010661 LL | B | Same as A only reduced concentration of "Carbopol 941" to 0.25%. | 256 |
| 010661 LL | C | Same as A only reduced concentration of "Carbopol 941" to 0.125%. | 55.8 |
| 010661 LL | D | Same as A only the "Carbopol 941" was not neutralized with base. | 22.6 |
| 010661 LL | E | Same as A only used 6 mls. distilled water to disperse influenza vaccine. | <4 |
| 010661 LL | F | 6 mls. of 0.5% "Carbopol 941" was neutralized with sodium hydroxide. | 0 |
| 010661 LL | G | Equal volumes of a liquid influenza vaccine with blank F. | 415.8 |
| 010661 LL | H | Made from equal reserved volumes of E and F. | 724.1 |
| 010661 LL | I | Liquid influenza vaccine PR-8, lot dated May 19, 1960. | 103.8 |

(2) *Interpretation of data.*—Now considering Sub-Lots A, B and C: Reducing the concentration of "Carbopol 941" from 0.5% to 0.25% did not significantly reduce the adjuvant activity. However, a further reduction of concentration of "Carbopol 941" to 0.125% did significantly reduce the adjuvant activity.

Considering Sub-Lot D: Using unneutralized "Carbopol 941" did significantly reduce the adjuvant activity. It is to be noted that this loss of activity may have resulted from destruction of the antigen because of the acidity of the final vaccine. It is felt that other types of antigens might be more stable in this acid gel resulting in no loss of adjuvant activity.

Considering Sub-Lot E with H: Approximately one-half of E was combined with an equal volume of F. These two samples were stored at plus 5° C. for three days before injecting. E alone showed almost complete lack of its antigenicity. The remaining portion of E that was combined with an equal portion of F and reported under H shows the remarkable stabilizing action of the "Carbopol 941."

Considering Sub-Lots G and I: These data clearly indicate that "Carbopol 941" is also adjuvant for liquid influenza PR-8.

D. TEST NO. 4

(1) The virus was prepared as in Test No. 1.

(2) The experimental vaccines were prepared as in Test No. 1.

(3) "Carbopol 941" was used and was neutralized, using sodium hydroxide. This solution was then treated with aluminum chloride to replace ⅔ of the sodium with aluminum and produced an insoluble salt.

(4) The actual test vaccine was prepared by combining the vaccine with 6 ml. of 0.5% "Carbopol 941" neutralized as above described.

| Lot | Description | 2-week titer | 4-week titer |
|---|---|---|---|
| 031561 LL | 88.8 mgm. of 100 mesh dried influenza vaccine in 6 ml. of 0.5% insoluble sodium aluminum salt of "Carbopol 941." | 64 | 337 |

EXAMPLE NO. 2

Leptospira pomona *vaccine (commercial)*

A. CONDUCT OF EXPERIMENT

A single lot of Leptospira vaccine was divided into two equal volumes and two modified experimental vaccines prepared according to the foregoing formula:

Percent
(1) Leptospira vaccine _____ 50
    Aluminum hydroxide _____ 15
    Stuart's medium _____ 35
(2) Leptospira vaccine _____ 50
    "Carbopol 941" gel 0.5% _____ 50

The test was a comparison of the antibody response in guinea pigs of these two experimental vaccines.

Six guinea pigs were used for each of the preparations.

The dose per animal was 1.0 ml. injected subcutaneously. The pre-inoculation sera from the guinea pigs were negative to the Agglutination-Lysis test. Sera taken three weeks post-inoculation were tested by the Agglutination-Lysis test with the following results:

| GP No. | Adjuvant | Three weeks | | | | | |
|---|---|---|---|---|---|---|---|
| | | 1:10 | 1:50 | 1:250 | 1:1250 | 1:6250 | 1:3100 |
| 1 | "Carbopol 941" | ? | ? | 2+ | — | — | — |
| 2 | "Carbopol 941" | 4+ | 4+ | 3+ | ± | — | — |
| 3 | "Carbopol 941" | 4+ | 4+ | 4+ | — | — | — |
| 4 | "Carbopol 941" | 4+ | 4+ | 4+ | 2+ | ± | — |
| 5 | "Carbopol 941" | 4+ | 4+ | 4+ | 4+ | ± | — |
| 6 | "Carbopol 941" | 4+ | 4+ | 4+ | 2+ | ± | — |
| 7 | AL(OH)₃ | 4+ | 2+ | — | — | — | — |
| 8 | AL(OH)₃ | 4+ | 2+ | — | — | — | — |
| 9 | AL(OH)₃ | 4+ | 4+ | 3+ | ± | — | — |
| 10 | AL(OH)₃ | 4+ | + | — | — | — | — |
| 11 | AL(OH)₃ | 4+ | 4+ | 4+ | ± | — | — |
| 12 | AL(OH)₃ | 4+ | 4+ | 2+ | — | — | — |

In the test five-fold dilutions of sera were made. The results show that "Carbopol 941" is effective at a five times greater dilution than aluminum hydroxide: 1:1250 for "Carbopol 941" as compared to 1:250 for aluminum hydroxide.

EXAMPLE NO. 3

Polio

A. CONDUCT OF EXPERIMENT

A single lot of commercially available poliomyelitis vaccine was divided into equal volumes and two modified experimental vaccines prepared according to the foregoing formula:

Percent (1) Commercial poliomyelitis vaccine _____ 50
    "Carbopol" gel 0.5% _____ 50
(2) Polio vaccine _____ 50
    Medium 199 _____ 50

Four rabbits were injected intramuscularly with 2 ml. of vaccine without adjuvant and four rabbits were injected intramuscularly with 2 ml. of the experimentally diluted polio vaccine containing 0.25% "Carbopol 941."

Two weeks following the single injections of both vaccines the pooled sera of the group of rabbits receiving the vaccine containing "Carbopol 941" had significantly higher antibody titers to all three types of polio than the control. A second injection was given each animal following the same procedure and two weeks later the pooled sera was tested again. Results again demonstrated higher titers for each type of polio in animals inoculated with the vaccine containing "Carbopol 941" as compared to the control. Titers were determined using the standard neutralization test in tissue cultures.

A second test using guinea pigs showed an increased titer to Type III, two weeks after injection of vaccine with "Carbopol 941." There was no significant response to Types I and II at the end of two weeks. A second injection was given and the guinea pigs were bled after two weeks and again injected.

These data are presented in the following table:

| Titers | Control | | | "Carbopol 941" | | |
|---|---|---|---|---|---|---|
| | 1st Inj. | 2nd Inj. | 3rd Inj. | 1st Inj. | 2nd Inj. | 3rd Inj. |
| Rabbits: | | | | | | |
| Type I | 1:6 | 1:4 | -------- | 1:10 | 1:23 | -------- |
| Type II | <1:4 | <1:4 | -------- | 1:6 | 1:12 | -------- |
| Type III | <1:4 | <1:4 | -------- | 1:12 | 1:20 | -------- |
| Guinea Pigs: | | | | | | |
| Type I | <1:4 | 1:21 | 1:24 | <1:4 | >1:64 | 1:105 |
| Type II | <1:4 | 1:21 | 1:24 | <1:4 | >1:64 | 1:164 |
| Type III | 1:7 | 1:40 | 1:32 | 1:16 | >1:64 | 1:164 |

Titers are significantly higher than the control for all three types of polio and at the end of six weeks the titer was approximately five times higher than the titer of the controls.

EXAMPLE NO. 4

Blackleg vaccine (commercial)

Blackleg (*Clostridium chauvoei*) vaccine, prepared for this example, was a formalin killed bacterial vaccine. A portion of this vaccine was adsorbed on aluminum hydroxide, a well established adjuvant for this product. The remaining portion of this vaccine was combined with "Carbopol 941" in a final concentration of 0.25%.

The blackleg vaccine containing aluminum hydroxide was injected subcutaneously into three groups of guinea pigs at different dose level for each group; 0.1 ml., 0.02 ml. and 0.004 ml. The blackleg vaccine containing the "Carbopol 941" was injected in precisely the same manner in three different groups of guinea pigs. One group of 5 guinea pigs remained uninoculated as controls for the experiment.

Two and one-half weeks following vaccination all inoculated guinea pigs and the five control guinea pigs were challenged with a live culture of *Clostridium chauvoei*.

Results of this test indicated that the vaccine containing "Carbopol 941" was equally effective as the vaccine containing aluminum hydroxide.

EXAMPLE NO. 5

Mumps (commercial vaccine)

A. CONDUCT OF EXPERIMENT

A standard liquid mumps vaccine was modified as follows:

(1) Diluted with an equal volume of normal saline.
(2) Diluted with an equal volume of 0.5% "Carbopol 941" gel. This resulted in a final concentration of 0.25% "Carbopol 941" in the test vaccine.
(3) Diluted with 15% aluminum hydroxide gel plus 35% normal saline.

The final concentration of active vaccine for each of the experimental vaccines, as can be seen, is 50% after dilution.

Each of these test vaccines was injected into one of three groups of six guinea pigs per group, by the intraperitoneal route; 0.5 ml. per animal. Neutralization tests in tissue culture were run after 2, 4 and 6 weeks on the pooled sera. Results were as follows:

| Vaccine preparation | Titers | | |
|---|---|---|---|
| | 2 weeks | 4 weeks | 6 weeks |
| Fluid vaccine | 1:48 | 1:112 | 1:66 |
| Fluid vaccine plus 0.25% "Carbopol 941" | 1:72 | 1:256 | 1:208 |
| Aluminum hydroxide adsorbed | 1:72 | 1:240 | 1:177 |

These data show that "Carbopol 941" has equal activity to aluminum hydroxide.

EXAMPLE NO. 6

Pediatric dip-tet

A pediatric diphtheria-tetanus toxoid vaccine was tested by the standard method as a vaccine modified by the use of "Carbopol 941" in a final concentration of 0.25% and the same vaccine modified with aluminum hydroxide gel and the antigenic potency further adjusted to be equivalent to the "Carbopol 941" vaccine.

Eight guinea pigs were used for each test vaccine. In the case of the tetanus toxoid, animals were bled after the 4th and 6th weeks. The pooled sera from a bleeding were tested and the results were the same for the aluminum hydroxide and the "Carbopol 941" vaccines. In the case of the diphtheria toxoid, the final results after 4 weeks were the same with the vaccine with the "Carbopol 941" and the aluminum hydroxide gel.

EXAMPLE NO. 7

Pertussis vaccine

Three preparations of pertussis vaccine were tested for potency by the standard mouse method. Results from the test showed the "Carbopol 941" increased the antigenicity of the vaccine above the plain vaccine and aluminum hydroxide adsorbed vaccine.

EXAMPLE NO. 8

| Vaccine | $PD_{50}$ |
|---|---|
| Pertussis, Plain | 0.256 billion organisms. |
| Pertussis plus aluminum hydroxide | 0.350 billion organisms. |
| Pertussis plus 0.25% "Carbopol 941" | 0.165 billion organisms. |

From the above it will be seen that the polymer in question, when used as an adjuvant, serves to greatly enhance the effectiveness of a variety of antigens, regardless of whether they are viral, toxoidal or bacterial, and regardless of the animal host.

The end product is in the form of a gel, the viscosity of which depends upon the quantity of polymer used. The specific quantity used is a matter of degree. Since an antigen-polymer solution containing less than 0.125% of the polymer has no appreciable adjuvant action, the mixture should contain at least this amount of polymer. The maximum quantity of polymer is determined by the fluidity of the solution or suspension, and here, for practical purposes, the fluidity of the solution should be such that the solution can be made to flow fairly freely through a hypodermic needle. This maximum quantity I have found to be about 2.00%.

I claim:
1. A biologic consisting essentially of an antigen-adjuvant mixture wherein said adjuvant is in the form of a colloidally water-soluble polymer of acrylic acid crosslinked with from 0.75% to 2.00% of a crosslinking agent selected from the class consisting of polyallyl sucrose and polyallyl pentaerythritol.
2. A biologic consisting essentially of an antigen admixed with from 0.125% to 2.00% of an adjuvant in the form of a colloidally water-soluble polymer of acrylic acid crosslinked with from 0.75% to 2.00% of a crosslinking agent selected from the class consisting of polyallyl sucrose and polyallyl pentaerythritol.
3. A biologic consisting essentially of an antigen-adjuvant mixture wherein said adjuvant is in the insoluble sodium aluminum salt form of a colloidally water-soluble polymer of acrylic acid crosslinked with from 0.75% to 2.00% of a crosslinking agent selected from the class consisting of polyallyl sucrose and polyallyl pentaerythritol.

References Cited by the Examiner

UNITED STATES PATENTS

| | | | |
|---|---|---|---|
| 2,166,074 | 7/39 | Reichel | 252—6 |
| 2,487,600 | 11/49 | Schneiderwirth | 252—316 |
| 2,511,740 | 6/50 | Schneiderwirth | 252—317 |
| 2,529,461 | 11/50 | Schneiderwirth | 252—310 |
| 2,798,053 | 7/57 | Brown | 260—2.2 |
| 2,909,462 | 10/59 | Warfield et al. | 167—56 |
| 2,912,358 | 11/59 | Staib | 167—55 |
| 2,923,692 | 2/60 | Ackerman et al. | 260—17.4 |
| 2,967,802 | 1/61 | Towey et al. | 167—78 |
| 2,980,655 | 4/61 | Glass et al. | 260—80.3 |
| 3,099,601 | 7/63 | Davis et al. | 167—78 |

OTHER REFERENCES

Spiers et al.: "Antigen-Antibody Reactions in Gel Single Diffusion: Theoretical Considerations," Review of Allergy and Applied Immunology, vol. 12, No. 4, page 492, July 1958.

Lee et al.: "Pharmaceutical Applications of the Sodium Salt of Carbopol 934," J.A.Ph.A., Sci. Ed. 48, pages 92–94 (1959).

Kabat et al.: "Experimental Immunochemistry," 2nd Ed., "Diffusion-Diffusion Coefficients From Antigen Interaction in Gels," pages 675–686, published May 1961, Chas. C. Thomas, Springfield, Illinois.

LEWIS GOTTS, *Primary Examiner.*

M. O. WOLK, *Examiner.*